United States Patent [19]
Hashimoto et al.

[11] Patent Number: 5,409,430
[45] Date of Patent: Apr. 25, 1995

[54] PLANETARY GEAR SYSTEM

[75] Inventors: Keishi Hashimoto, Yawata; Masaaki Kimura, Takatsuki; Jiro Miyamoto, Nishikyo, all of Japan

[73] Assignee: Tsubakimoto Chain Co., Osaka, Japan

[21] Appl. No.: 144,517

[22] Filed: Nov. 2, 1993

[30] Foreign Application Priority Data

Dec. 4, 1992 [JP] Japan .................. 4-089966 U

[51] Int. Cl.⁶ ................................ F16H 3/08
[52] U.S. Cl. ................................ 475/331; 74/409
[58] Field of Search ................ 74/409; 475/331, 344

[56] References Cited

U.S. PATENT DOCUMENTS

| | | | |
|---|---|---|---|
| 4,019,422 | 4/1977 | Magnuson | 89/1.185 |
| 4,946,428 | 8/1990 | Barozzi | 475/164 |
| 5,123,300 | 6/1992 | Himmelein et al. | 74/640 |
| 5,240,462 | 8/1993 | Mochizuki et al. | 475/342 |
| 5,242,336 | 9/1993 | Hori | 475/336 |

*Primary Examiner*—Dirk Wright
*Attorney, Agent, or Firm*—Birch, Stewart, Kolasch & Birch

[57] ABSTRACT

A planetary gear system has a driven sun gear, an internal gear fixed on a case concentrically with the sun gear, a rotatable shaft concentric with the sun gear having a carrier, and planetary gears on the carrier for engagement with the sun gear and the internal gear. The internal gear is divided in the axial direction into first and second internal gear sections which are adjustable in their relative angle in the circumferential direction so as to reduce a backlash in the engagement with the planetary gears. The planetary gears comprise a large planetary gear part for engagement with the sun gear and a small planetary gear part concentric with the large planetary gear part for engagement with the internal gear.

3 Claims, 5 Drawing Sheets

PLANETARY GEAR SYSTEM

BACKGROUND OF THE INVENTION

The present invention relates to a planetary gear system capable of reducing a backlash.

FIELD OF THE INVENTION

It is required in a gear system used for transmitting rotations of a servo-motor, driving a precision processing machine and the like, in addition to functions of acceleration, deceleration and transmission of rotations, that the rotation in either direction can be precisely transmitted without any play in the rotation.

However, in a gear system using a planetary gear mechanism, a transmission mechanism is complicated, and a rotational play cannot be easily eliminated.

It is hence a primary object of the invention to provide a planetary gear system capable of controlling the backlash through a simple adjustment and reducing the play between input and output shafts so as to allow forward and reverse operations at a high precision.

According to one aspect of the present invention, a planetary gear system comprising
 a case,
 a driven sun gear pivotally supported on the case,
 an internal gear fixed on the case concentrically with the sun gear,
 a rotatable shaft pivotally supported on the case concentrically with the sun gear and having a carrier formed on the rotatable shaft, and
 planetary gears pivotally supported on the carrier and engaged with the sun gear and the internal gear, wherein
 the internal gear is divided in the axial direction into a first internal gear section and a second internal gear section which are adjustable in their relative angle in the circumferential direction so as to reduce a backlash in the engagement with the planetary gears, and
 the planetary gears comprise a large planetary gear part for engagement with the sun gear and a small planetary gear part formed concentrically with the large planetary gear part for engagement with the internal gear.

The case may comprise a front case supporting the rotatable shaft and a rear case supporting the sun gear, and both first and second internal gear sections may be fixed to either one of the front and rear cases.

The sun gear may be integrally formed with an input shaft by cutting gear teeth in the input shaft.

BRIEF DESCRIPTION OF THE DRAWINGS

An embodiment of the present invention will now be described, by way of example, referring to the attached diagrammatic drawings, in which.

DETAILED DESCRIPTION OF THE INVENTION

Figure 1:
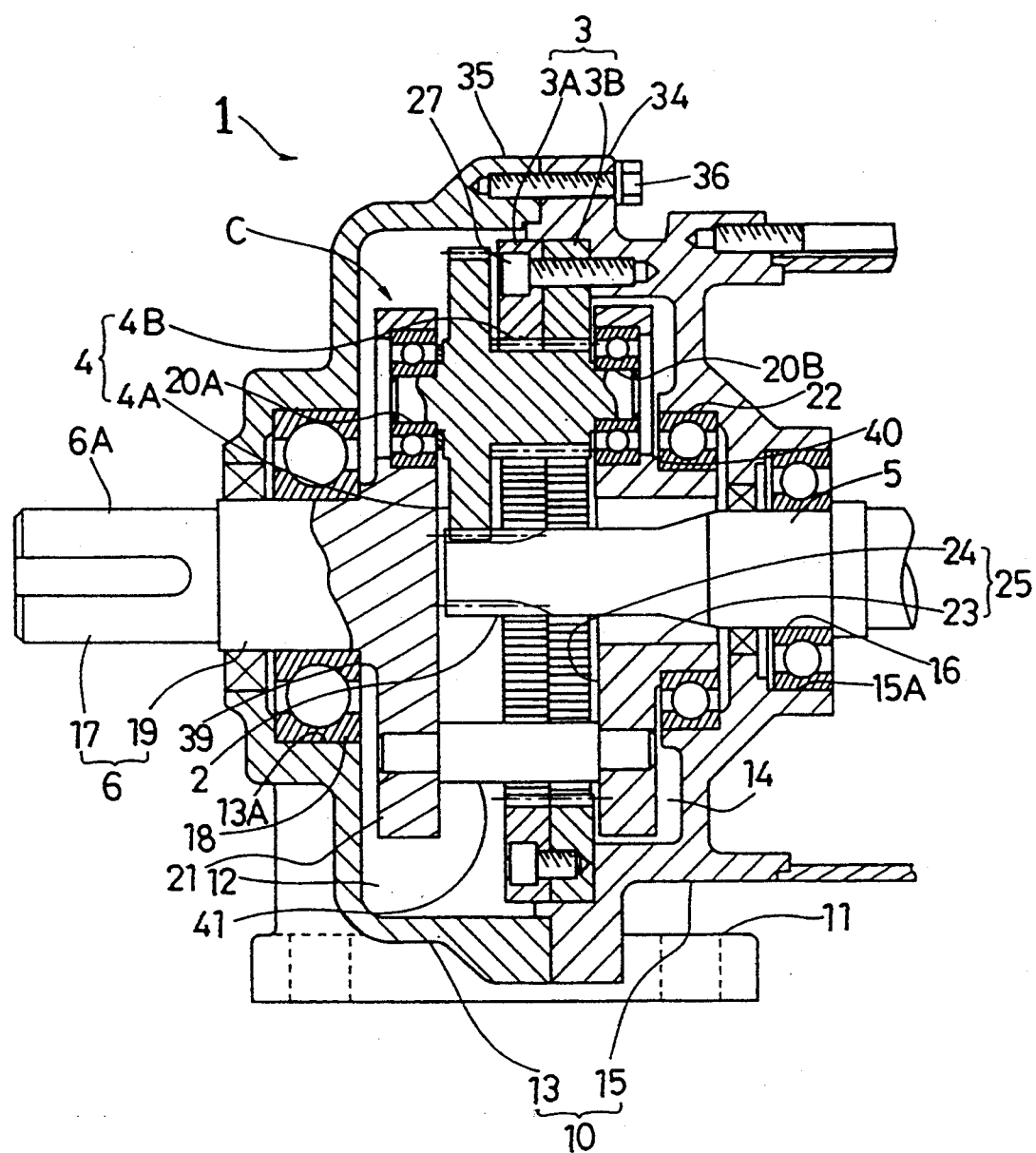
FIG. 1 is a longitudinal sectional view along the axial direction showing an embodiment of the invention.
Figure 2:
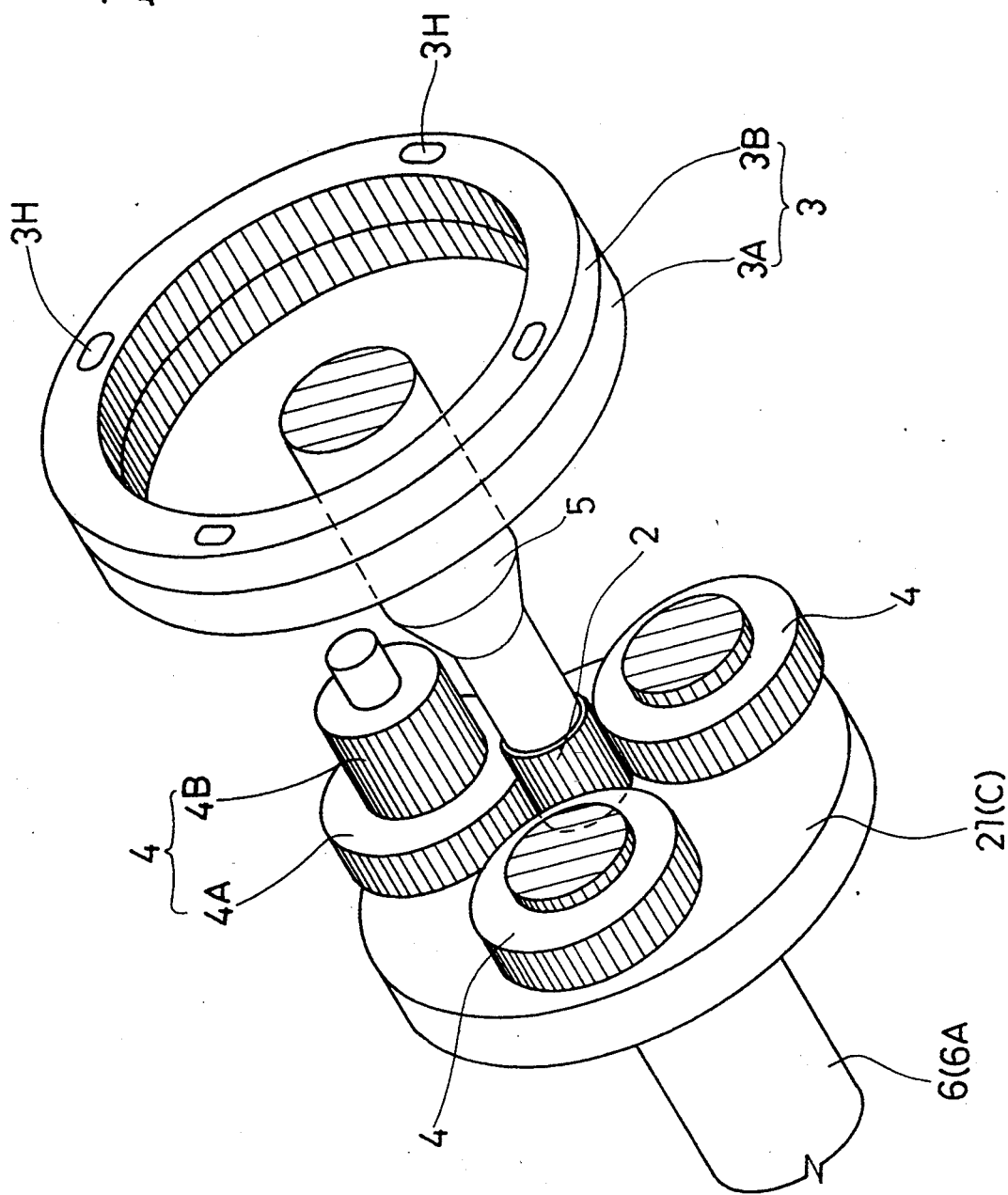
FIG. 2 is a schematic perspective view explaining an engagement of gears.
Figure 3:
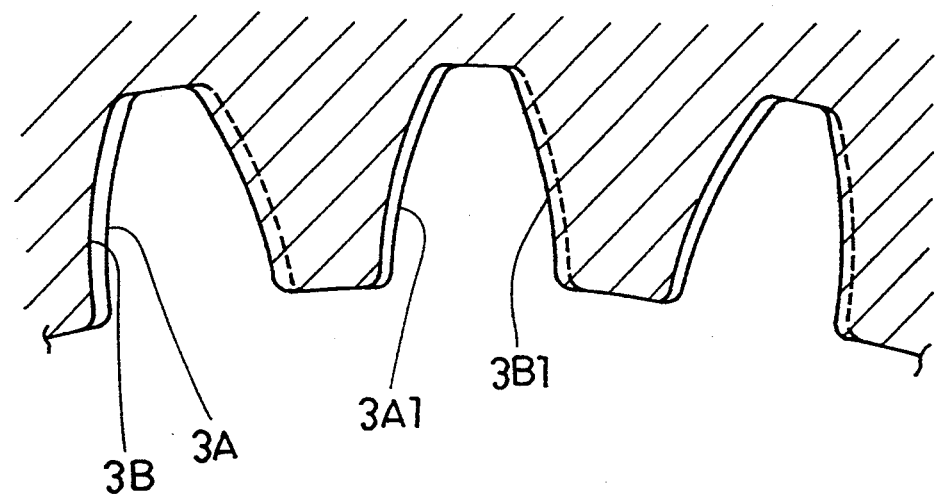
FIG. 3 is a enlarged sectional view explaining an adjustment of internal gear sections in the circumferential direction.

FIG. 1 to 3 show an embodiment, wherein a planetary gear system 1 comprises a case 10, a driven sun gear 2 pivotally supported on the case 10, an internal gear 3 fixed on the case 10 concentrically with the sun gear 2, a rotatable shaft 6 pivotally supported on the case 10 concentrically with the sun gear 2 and having a carrier C formed on an inner end thereof, and planetary gears 4 pivotally supported on the carrier C. The internal gear 3 is divided in the axial direction into a first internal gear section 3A and a second internal gear section 3B, and the planetary gears 4 comprise a large planetary gear part 4A for engagement with the sun gear 2 and a small planetary gear part 4B formed concentrically with the large planetary gear part 4A for engagement with the internal gear 3.

The case 10 comprises a front case 13 for supporting the rotatable shaft 6 and a rear case 15 for supporting the sun gear 2, and both first and second internal gear sections 3A, 3B are attached to either one of the front and rear cases 13, 15. In the embodiment, the internal gear sections 3A, 3B are attached to the rear case 15.

The front case 13 has a leg part 11 and a cylindrical part 12 opened in the backward direction. The rear case 15 has a cylindrical part 14 being concentric with the front cylindrical part 12 and opened in the forward direction.

The sun gear 2 is integrally formed with an input shaft 5 by cutting gear teeth in the input shaft 5 in a front end thereof. The input shaft 5 is rotatably held by the rear case 15 through a bearing 16 that is attached to a hole 15A provided at a center of a bottom of the rear cylindrical part 14, and the sun gear 2 is thereby supported by the rear case 15.

By forming the sun gear 2 with the input shaft 5 in such manner, the number of components and cost can be reduced in comparison with a conventional system with a sun gear fixed to an input shaft through a bush. Also, no assembly for the sun gear is required, thereby increasing a precision of gear, noise performance and the durability. In addition the sun gear can be formed in a smaller size, contributing to reduction in size of the entire system.

The carrier C is provided at rear end of the rotatable shaft 6 pivotally supported on the front case 13 concentrically with the sun gear 2. The rotatable shaft 6 is a output axis 6A, in the embodiment, and has a support part 19 extending from the carrier C and fitted in a bearing 18 that is attached to a hole 13A provided at a center of a bottom of the front cylindrical part 12, and a projecting part 17 extending from the support part 19 toward the front side over the front case 13, The carrier C comprises a front frame 21 disposed inside the front cylindrical part 12 and a rear frame 25 disposed inside the rear cylindrical part 14. The front frame 21 is a disk plate, in the embodiment, formed integrally with the support part 19 of rotation axis 6 through a step 39. The rear frame 25 has a disk part 24 parallel to the front frame 21 and a holder part 23 projecting from the disk part 24 and rotatably held, concentrically with the rotatable shaft 6, through a step 40 by a bearing 22 attached inside the rear cylindrical part 14. The rear frame 25 has a inner hole for passing through the sun gear 2.

The front and rear frame part 21 and 25 are coupled by means of a pin 41 cross-linking between them, and the carrier C is supported so as to be immobile in the axial direction and rotatable by abutting the bearings 18, 22 to the steps 39, 40.

Between the front and rear frame parts 21 and 25, for example, three planetary gears 4 spaced evenly with each other in the circumferential direction are rotatably placed in a cross-linked manner with either ends supported by bearings 20A, 20B employed in the front and rear frame parts 21 and 25, respectively.

The planetary gears 4 comprise a large planetary gear part 4A in the diameter for engagement with the sun gear 2 and a small planetary gear part 4B in the diameter projecting toward the rear side concentrically with the large planetary gear part 4A for engagement with the internal gear 3.

In the embodiment, the large and small planetary gear parts 4A and 4B are integrally molded beforehand by means of metal sintering. By integrally forming the large and small planetary gear parts 4A and 4B in such manner, the planetary gears 4 can be provided with a higher gearing precision, such operation as phase matching that requires a high precision technology can be eliminated, and the production is facilitated, in comparison with the case of forming a planetary gear wherein small planetary gears are set in an internal gear provided in a central hole of the large planetary gear. Incidentally, the planetary gears 4 may be integrally molded by using plastics and the like depending on transmission capacities and applications.

The internal gear 3 comprises the first and second internal gear sections 3A, 3B being concentric, identical in size with each other and aligned in the axial direction. The first and second internal gear sections 3A, 3B are fixed to the rear cylindrical part 14 by means of a bolt 27. The internal gear sections 3A, 3B are adjustable in their relative angle in the circumferential direction F, as shown in FIGS. 2 and 3.

In the embodiment, among the holes of the internal gear sections 3A, 3B for passing the bolt 27, the holes of one of the internal gear sections are formed as a slot 3H extending in the circumferential direction in order to adjust the relative angle of the gear sections 3A, 3B. When fixing the internal gear 3 to the case 10, the relative angle of the internal gear sections 3A, 3B is adjusted so that tooth surfaces 3A1 of the first internal gear section 3A are directed so as to come closer to one of the tooth surfaces of small planetary gear part 4B, and tooth surfaces 3B1 of the second internal gear section 3B to the other tooth surface of the small planetary gear 4B, as shown in FIG. 3. As a result, it is possible to reduce the backlash nearly to zero as well as applying a slight backlash as desired by a simple operation.

The front and rear cases 13 and 15 are combined by using a bolt 36 that is passed through a flange 34 in a circumferential surface of the rear case 15, and screwed and fixed to a flange 35 in the front case 13. The rotations of the input shaft 5 are transmitted to the planetary gears 4 through the sun gear 2, and the rotatable shaft 6 with the carrier C is rotated as the planetary gears 4 are revolved along the internal gear 3.

Thus, because the first and second internal gear sections 3A, 3B are fixed to either one of the front and rear cases 13 and 15, the rear case 15, in the embodiment, by means of a bolt, adjustment of the backlash can be easily achieved, in addition, phase matching of the first and second internal gear sections 3A, 3B is eliminated, and the assembly of the gear system is conveniently conducted.

Figure 4:
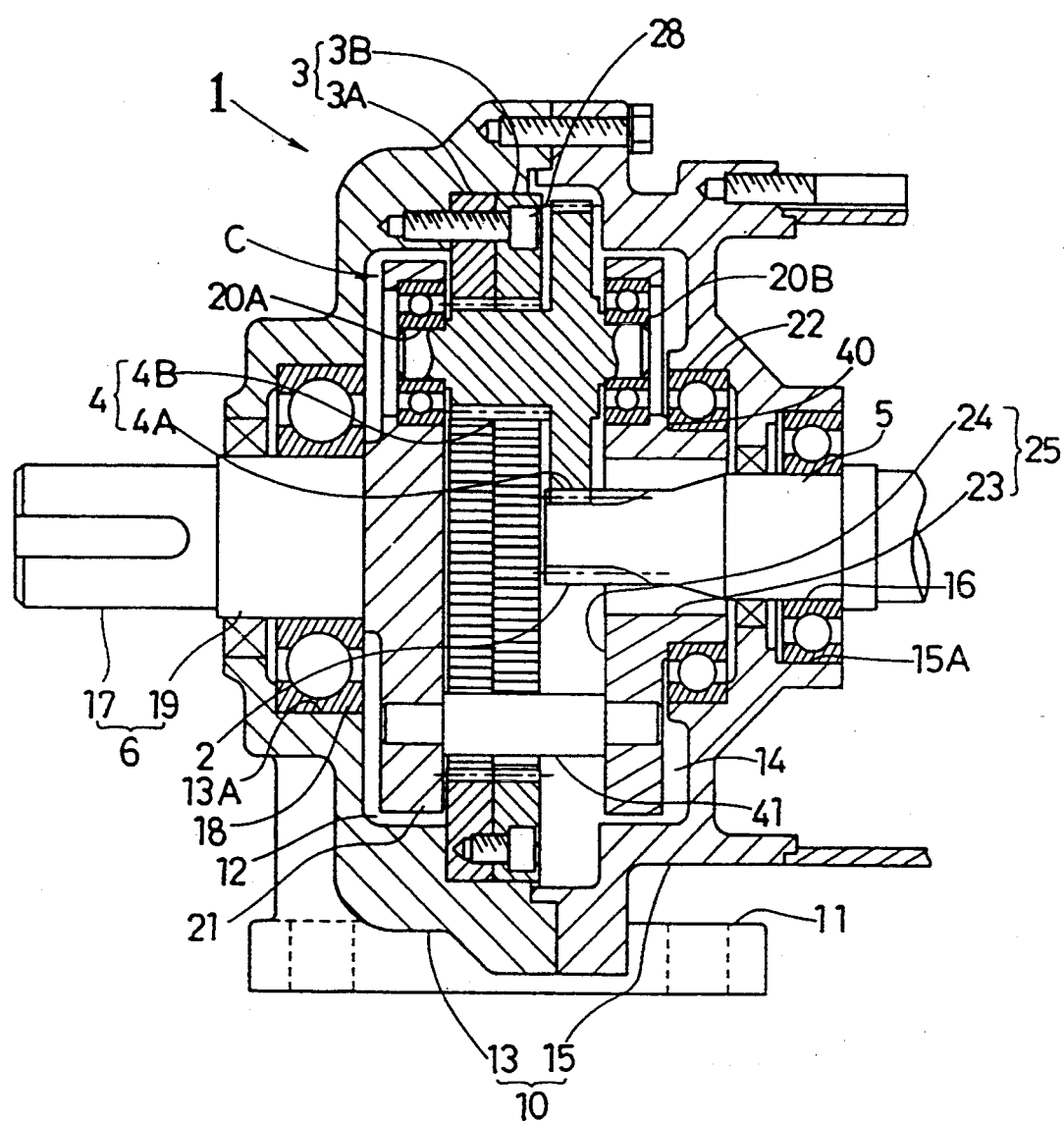
FIG. 4 is a longitudinal sectional view showing another embodiment of the invention.

In FIG. 4, another embodiment with first and second gear sections 3A, 3B attached to the front case 13 by means of bolt 28 according to the invention is shown.

In the embodiment, planetary gears 4 comprise a large planetary gear part 4A for engagement with a sun gear 2 and a small planetary gear part 4B projecting toward the forward side for engagement with an internal gear 3, and the first and second internal gear sections 3A, 3B are fixed on a front case 13 by means of a bolt. Therefore, the internal gear sections 3A, 3B can be easily offset in the circumferential direction at such angle that any backlash in relation with the planetary gears is eliminated, and assembly of a planetary gear system 1 is conveniently conducted, as the front and rear cases 13 and 15 can be combined in such state that the first and second gear sections 3A, 3B have been adjusted beforehand in phase, and attached thereto.

Figure 5:
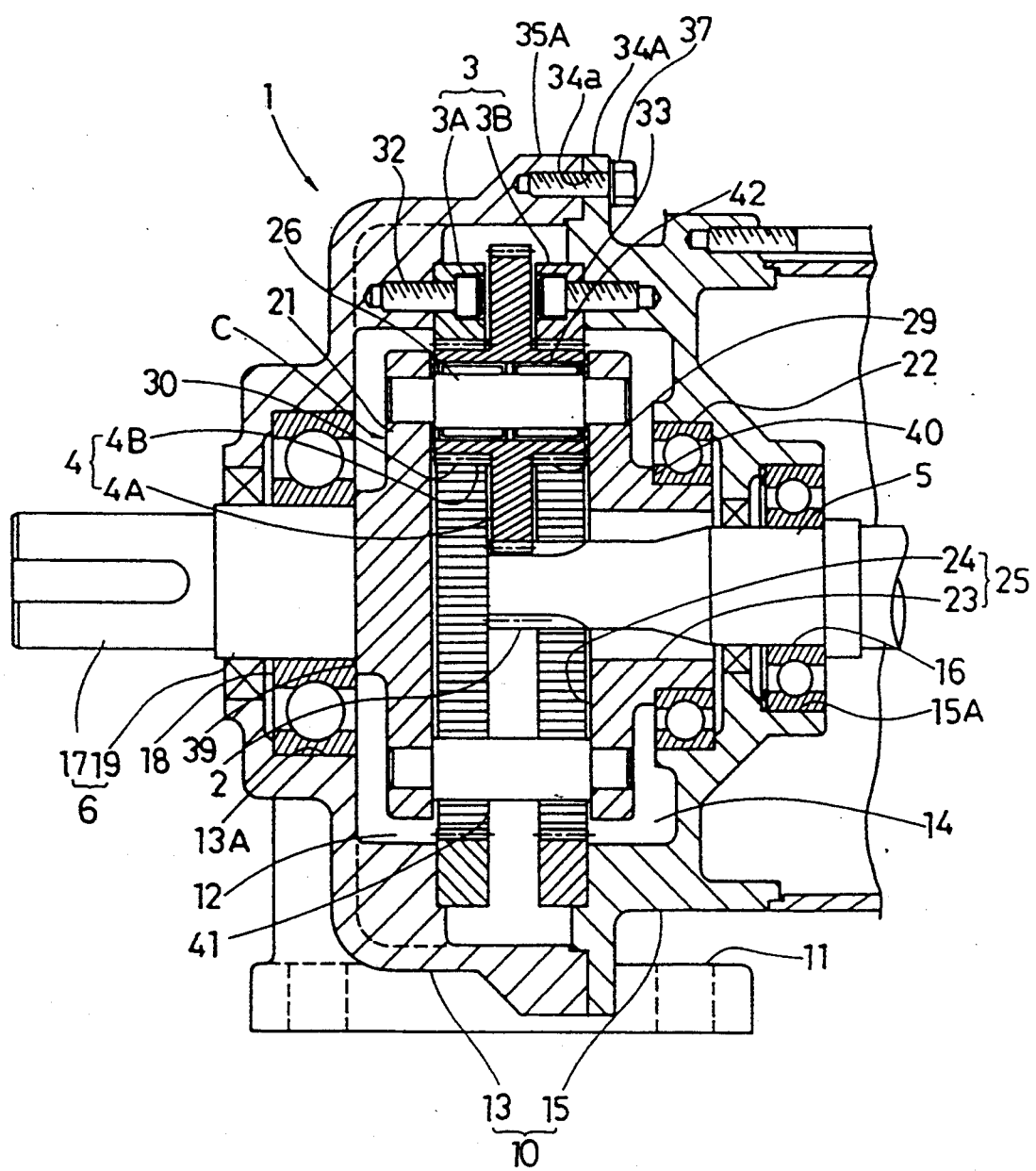
FIG. 5 is a longitudinal sectional view showing still other embodiment of the invention.

In FIG. 5, other embodiment of the invention is shown.

In the embodiment, planetary gears 4 are rotatably attached through a needle-like roller bearing 42 to a shaft member 26 that is bridged between the front and rear frame 21 and 25 of carrier C. And planetary gears 4 comprise a large planetary gear part 4A for engagement with the sun gear 2 and a small planetary gear parts 4B having a front gear portion 30 and rear gear portion 29 of an identical size projecting in the opposite directions concentrically with the large planetary gear part 4A. The large and small planetary gear parts 4A and 4B are integrally molded beforehand by means of metal sintering or the like, and the small planetary gear part 4B is in engagement with an internal gear 3.

The internal gear 3 comprises a first internal gear section 3A fixed on a front cylindrical part 12 by means of a bolt 32 and a second internal gear section 3B fixed on a rear cylindrical part 14 concentrically with the first internal gear section 3A by means of a bolt 33, wherein the first internal gear section 3A is in engagement with the front gear portion 30 of small planetary gear 4B, and the second internal gear section 3B with the rear gear portion 29.

The front and rear cases 13 and 15 can be combined, for example, by using a bolt 37 which passes through a slot 34a extending in the circumferential direction of a flange 34A of the rear case 15, and is screwed to fixed to a flange 35 of the front case 13. In such case, as the rear case 15 is rotatable in the circumferential direction, allowing the bolt 37 to follow the slot 37, the second internal gear section 3B fixed to the rear case 15 and the first internal gear section 3A fixed to the front case 13 can be offset at such angle that any backlash in the engagement with the planetary gears 4 is eliminated.

What is claimed is:

1. A planetary gear system comprising
   a case,
   a driven sun gear pivotally supported on the case,
   an internal gear fixed on the case concentrically with the sun gear,
   a rotatable shaft pivotally supported on the case concentrically with the sun gear and having a carrier provided on the rotatable shaft, and
   planetary gears pivotally supported on the carrier and engaged with the sun gear and the internal gear, wherein
   the internal gear is divided in the axial direction into a first internal gear section and a second internal gear section which are adjustable in their relative angle in the circumferential direction so as to reduce a backlash in the engagement with the planetary gears, and the planetary gears comprise a large planetary gear part for engagement with the sun gear and a small planetary gear part formed concentrically with the large planetary gear part for engagement with the internal gear.

2. A planetary gear system according to claim 1, wherein the case comprises a front case supporting the rotatable shaft and a rear case supporting the sun gear, and both first and second internal gear sections are fixed to either one of the front and rear cases.

3. A planetary gear system according to claim 1, wherein the sun gear is integrally formed with an input shaft by cutting gear teeth in the input shaft.

* * * * *